(12) United States Patent
Aldana

(10) Patent No.: US 8,780,549 B2
(45) Date of Patent: Jul. 15, 2014

(54) ELECTRONIC DEVICE SUPPORT WITH MAGNETIC INDEXING

(75) Inventor: Leonardo Aldana, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 197 days.

(21) Appl. No.: 13/489,735

(22) Filed: Jun. 6, 2012

(65) Prior Publication Data

US 2013/0329360 A1     Dec. 12, 2013

(51) Int. Cl.
| | |
|---|---|
| *H05K 5/00* | (2006.01) |
| *H05K 7/00* | (2006.01) |
| *G06F 1/16* | (2006.01) |

(52) U.S. Cl.
USPC ............ 361/679.44; 361/679.41; 361/679.42; 361/679.43

(58) Field of Classification Search
USPC .............. 361/679.41, 679.42, 679.43, 679.44
See application file for complete search history.

(56) References Cited

U.S. PATENT DOCUMENTS

| | | | |
|---|---|---|---|
| 3,264,678 A | 8/1966 | Parmelee | |
| 6,553,626 B2 | 4/2003 | Coburn | |
| 6,832,100 B2 | 12/2004 | Hsieh | |
| 7,016,492 B2 | 3/2006 | Pan et al. | |
| 8,015,666 B2 | 9/2011 | Wang | |
| 8,553,408 B2 * | 10/2013 | Supran et al. | 361/679.41 |
| 2003/0167599 A1 | 9/2003 | Seidler | |
| 2007/0157432 A1 | 7/2007 | Weinstein | |
| 2009/0167472 A1 | 7/2009 | Lu | |
| 2009/0322278 A1 | 12/2009 | Franks et al. | |
| 2010/0081377 A1 | 4/2010 | Chatterjee et al. | |
| 2011/0122594 A1 | 5/2011 | Griffin | |
| 2012/0202427 A1 * | 8/2012 | Gioscia et al. | 455/41.2 |
| 2014/0036437 A1 * | 2/2014 | Supran et al. | 361/679.41 |

FOREIGN PATENT DOCUMENTS

KR     10-2006-0020910     3/2006

OTHER PUBLICATIONS

Extended European Search Report issued in European Application No. 12171085.9 on Oct. 29, 2012; 7 pages.

* cited by examiner

*Primary Examiner* — Anthony Haughton
(74) *Attorney, Agent, or Firm* — Fish & Richardson P.C.

(57) ABSTRACT

An electronic device support has a receptacle with an electronic device receiving cavity and a first magnetic indexing part. A base is hingedly coupled to the receptacle and has a second magnetic indexing part. The first and second magnetic indexing parts are configured to allow the receptacle to rotate relative to the base when rotationally apart from a specified orientation and to magnetically support the receptacle when in the specified orientation.

20 Claims, 2 Drawing Sheets

ELECTRONIC DEVICE SUPPORT WITH MAGNETIC INDEXING

BACKGROUND

A support for an electronic device can provide various functions, including battery charging, data read-write with a connected computer/device, and supporting the device in a position to easily view a screen. When using touch screen devices, the user may also want to use the touch-screen while in a docking station. Typical friction hinges, like used in laptops for example, cannot provide the necessary support for using a touch screen.

DESCRIPTION OF DRAWINGS

Like reference symbols in the various drawings indicate like elements.

DETAILED DESCRIPTION

Figure 1:
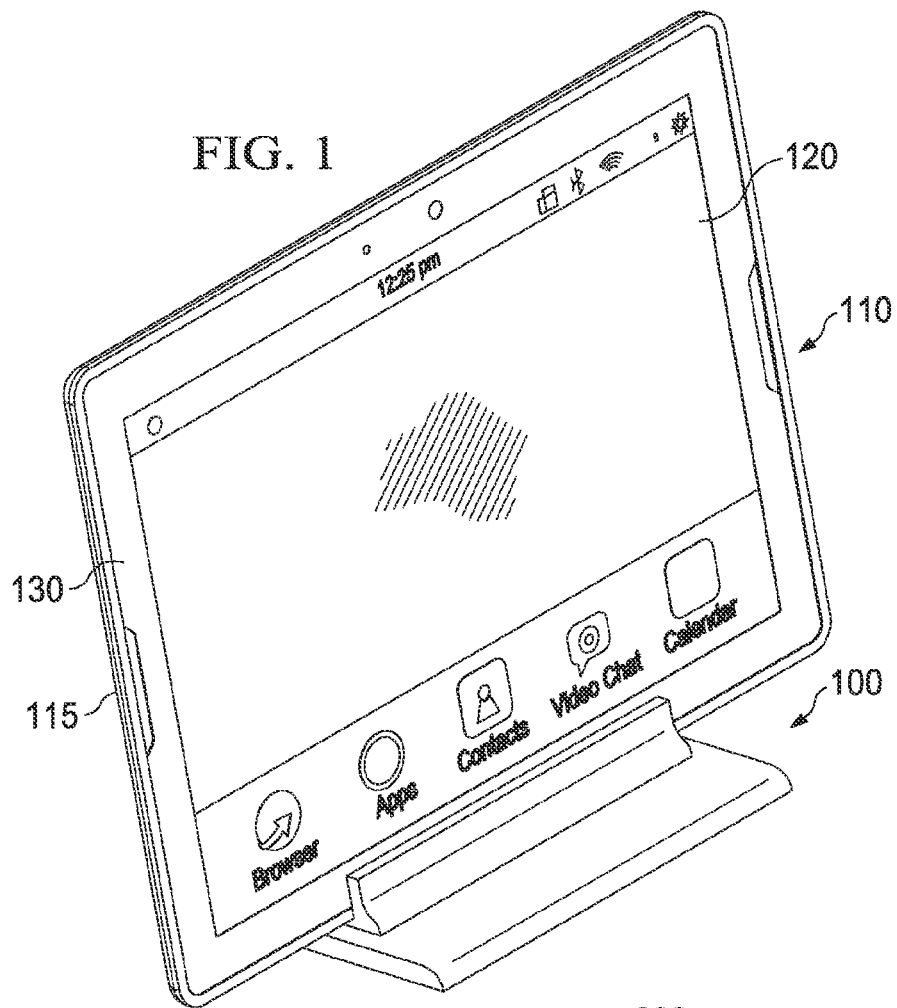
FIG. 1 is a front perspective view of a mobile electronic device in an example support.

FIG. 1A is a front perspective view of an example electronic device support 100 shown receiving and supporting an electronic device 110. As will be discussed in more detail below, the support 100 can be placed on a substantially planar surface, such as a desk or table top, and adjusted to support the mobile electronic device 110 in one or more specified orientations. The support 100 may provide additional functions such as interfacing with the device 110 to charge the device battery, communicate data between the device 110 and a memory of the support 100, communicate data between the device 110 and a computer or network coupled to the support 100, and/or perform other functions. The example support 100 is but one example of a number of different forms of supports that the concepts herein can be applied to. For example, the support 100 can take the form of a docking station, a charger, a stand, a case, a cover and/or another form. Although shown with a mobile electronic device 110, the same concepts could be applied to As will be described in more detail below, the support 100 uses magnets to support the device 110 in the one or more different orientations.

The mobile electronic device 110 can be hand held and can be a cellular phone, including a smart phone, a dedicated personal digital assistant (PDA) with or without phone or data capabilities, an electronic reading device, a tablet computer, a digital media player, or any other mobile device. In many instances, the terms "mobile electronic device," "hand held device" and "hand set" are interchangeable, regarding to electronic devices available as information stores for personal contacts, calendar appointments, and the like. The mobile device can have a battery, enabling the device to be operated without a power cord. Additionally, many mobile electronic devices wirelessly connect to the public Internet to allow for the sending and receiving of e-mail. Such mobile devices may also provide more general Internet access, such as access to the World Wide Web. For example, the mobile device 110 may be designed to operate with the General Packet Radio Service (GPRS) mobile data communication networks and may also be designed to operate with any of a variety of voice communication networks, such as AMPS, TDMA, CDMA, PCS, GSM, etc. Other types of data and voice networks, both separate and integrated, may also be utilized with the mobile device 110.

In certain instances, the mobile device 110 is a two-way RF communication device having voice and data communication capabilities. In addition, the mobile device 110 can have the capability to communicate with other mobile devices or computer systems via the Internet.

The mobile device 110 includes a front frame 130 and a screen 120. A forward facing surface of the front frame 130 forms the forward facing surface of the mobile device 110. A back cover 115 is attached to a back side of the front frame and a backward facing surface of the back cover 115 defines the back surface of the mobile device 110. The front frame 130 cooperates with the back cover 115 to house inner components of the mobile device 110.

The screen 120 can be both an input device (i.e., a touch sensitive device) and an output device (i.e., a display). In some embodiments, the screen 120 is a light emitting diode (LED) backlit liquid crystal display (LCD) with multi-touch control functions. Some of these features may be omitted in other examples. For example, the screen 120 may lack the multi-touch control functions, or the screen 120 may lack the LED backlit feature. In some embodiments, the mobile device 110 may include additional features, such as a front camera.

Figure 2:
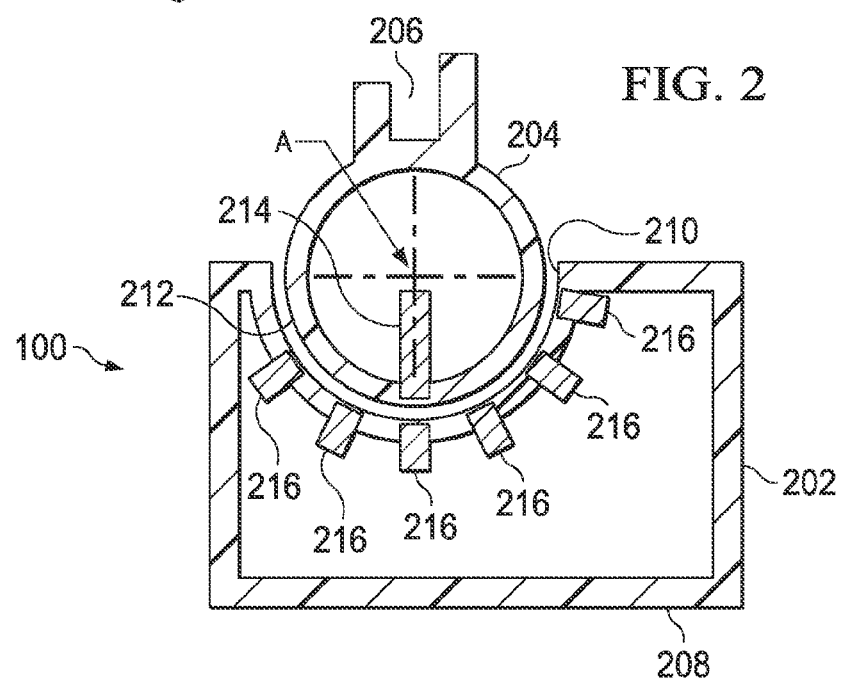
FIG. 2 is a side half cross-sectional view of the example support.

Referring to FIG. 2, the support 100 includes a base 202 and a receptacle 204 having a mobile electronic device receiving cavity 206 for coupling the device 110 to the receptacle 204. The base 202 has a bottom surface 208 that is configured to allow the support 100 to be placed on a substantially planar surface, for example a desktop or tabletop, and provide the stability necessary to support the mobile electronic device in one or more specified orientations. In certain instances, the base 202 is substantially planar, has feet and/or is otherwise configured to rest on a planar surface. Although shown as having a substantially rectangular cross-section, the shape of the base 202 can take many other different forms. Additionally, the base 202 can include accessories to the mobile electronic device, such as a keyboard for data input into the device, speakers, and/or other accessories.

The mobile electronic device receiving cavity 206 of the receptacle 204 is shaped to tightly receive and support the mobile electronic device (e.g., the mobile electronic device 110 of FIG. 1) in the one or more specified orientations. Although shown in FIG. 1 as defined by two sidewalls, a front and a rear sidewall, the cavity 206 can have additional sidewalls including one or more of a left and right sidewall. Additionally, in certain instances, the cavity 206 can include a latch or clip mechanism to positively engage and retainingly grip the mobile electronic device to the support 100.

The receptacle 204 is hinged relative to the base 202 so that the receptacle 204 remains fixed around a rotational axis A, yet can rotate around the axis A through a plurality of different angular orientations relative to the base 202. The arrangement of the hinge between the base 202 and receptacle 204 can take many forms, including a tang and pin, ball and socket, and/or other configuration.

In addition to the hinge arrangement, FIG. 2 shows the base 202 including a female portion 210 that closely receives, and in certain instances contacts, a male portion 212 of the receptacle 204. In other instances, the base 202 includes a male portion that is closely received in a female portion of the receptacle 204. The male portion 212 includes a first magnetic indexing part 214 that interfaces with a second magnetic indexing part 216 of the female portion 210. When rotationally aligned, the magnetic indexing parts 214, 216 act like detents in a mechanical indexing system by magnetically attracting and supplying a force that retains the receptacle 204, and thus the mobile electronic device, in one or more different specified orientations relative to the base 202 and the planar surface that it rests on. When rotationally apart (i.e., rotationally misaligned) the magnetic indexing parts 214, 216 do not magnetically attract, and thus allow the receptacle 204 to rotate relative to the base 202. In some configurations where both the magnetic indexing parts 214, 216 are magnetic, when dissimilar poles of the magnetic indexing parts 214, 216 are rotationally apart, both the repelling of like poles and the attraction of dissimilar poles of the magnetic indexing parts 214, 216 tends to push the receptacle 204 toward the rotationally nearest specified orientation.

FIG. 2 shows a configuration where the first magnetic indexing part 214 has a single element and the second magnetic indexing part 216 has a plurality of elements angularly arranged around the circumference of the female portion 210 (six shown, fewer or more could be provided). Each of the plurality of elements of the second magnetic indexing part 216 corresponds to a specified orientation of the receptacle 204 relative to the base 202. The element of the first magnetic indexing part 214 is a rectangular bar magnet, arranged on a radial of the male portion 212 and extending axially along a portion or all of the receptacle 204, parallel to rotational axis A. The plurality of elements of the second magnetic indexing part 216 are rectangular ferrous metallic bars arranged on radials of the female portion 210 and extending axially along a portion or all of the base 202. Thus, when the element of the first magnetic indexing part 214 rotationally aligns with one of the ferrous metal elements of the second magnetic indexing part 216, the magnetic element is attracted to the ferrous metal element creating an attractive force that supports the receptacle 204 in a specified orientation relative to the base 202. When the element of the first magnetic indexing part 214 is rotationally apart (i.e., rotationally misaligned) with the ferrous metal elements of the second magnetic indexing part 216, the indexing parts 214, 216 do not magnetically attract, and allow the receptacle 204 to rotate relative to the base 202.

In other examples, the element of the first magnetic indexing part 214 can be a ferrous metallic bar and the elements of the second magnetic indexing part 216 can be bar magnets, or both the element of the first magnetic indexing part 214 and the elements of the second magnetic indexing part 216 can be bar magnets. In an example where both the element of the first magnetic indexing part 214 and the second magnetic indexing part 216 are magnets, the magnets attract when a pole of the magnet element of the first magnetic indexing part 214 is rotationally aligned with an opposing pole of a magnet element of the second magnetic indexing part 216 (e.g., N to S or S to N) to retain the receptacle 204 in a specified orientation. However, when like poles of the magnets are aligned (e.g., N to N or S to S), they repel and tend to push the receptacle 204 toward the rotationally nearest specified orientation. It should also be appreciated that, in other examples, the first magnetic indexing part 214 can have a plurality of elements and the second magnetic indexing part 216 can be a single element, both the first magnetic indexing part 214 and the second magnetic indexing part 216 can each have a single element, or both the first magnetic indexing part 214 and the second magnetic indexing part 216 can each include a plurality of elements.

Figure 3:
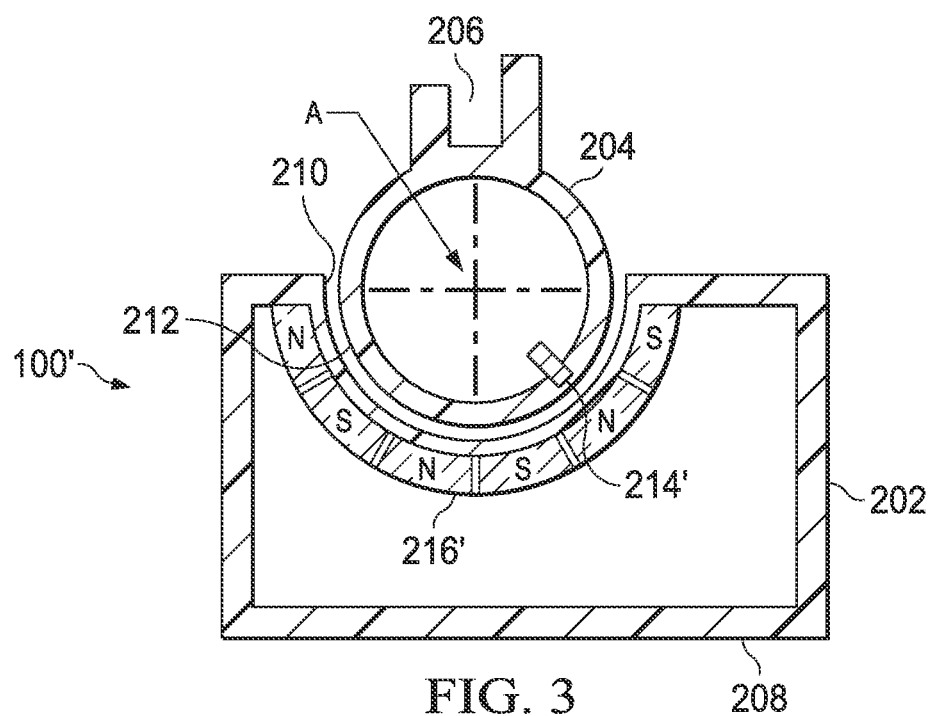
FIG. 3 is a side half cross-sectional view of another example support.

FIG. 3 shows another configuration of support 100' where the elements of the second magnetic indexing part 216' are a single magnet or multiple magnets arranged in a half cylinder that extends axially along a portion or all of the base 202. The half cylinder has alternating poles arranged around the circumference of the female portion. The first magnetic indexing part 214' is shown including a single rectangular ferrous metal element or magnet element extending along the axis of the receptacle 204, but could include a plurality of rectangular ferrous metal or magnetic elements. In other configurations, the first magnetic indexing part 214' can include a magnet arranged in a half or whole cylinder that extends axially along apportion or all of the receptacle 204, and the second magnetic indexing part 216' can include one or a plurality of ferrous metal or magnet elements or a magnet arranged in a half cylinder and/or another configuration.

As mentioned above, each of the second magnetic indexing parts 216 corresponds to a specified orientation of the receptacle 204 relative to the base 202. For example, in FIG. 2, when the element of the first magnetic indexing part 214 is aligned with an element of the second magnetic indexing part 216, the parts 214, 216 are magnetically attracted to provide a force that retains the receptacle 204 in a specified orientation relative to the base 202. In certain instances, the magnetic force can provide all (substantially or entirely) of the force to support the receptacle 204 in the specified orientation. In other instances, friction between the male and female portions 210, 212 and/or the hinge mechanism itself can substantially contribute. In the case of a touch screen mobile electronic device, the total force retaining the receptacle 204 in the specified orientation can be great enough to stably support the device without substantial movement as a user operates the touch screen.

FIG. 2 shows the receptacle 204 in an upright position with a centerline of the cavity 206 coinciding with a vertical plane orthogonal to the planar surface that the base 202 rests on. The configuration of FIG. 2 shows two further specified orientations having the cavity 206 angularly displaced to one side of this vertical plane, and three further specified orientations having the cavity 206 angularly displaced to the other side of this vertical plane. In certain instances, at least one of the specified orientations can be selected to orient the plane of the mobile electronic device at an acute angle relative to the planar surface on which the base 202 rests to maintain the mobile electronic device in an orientation that facilitates typing on a touch screen of the mobile electronic device. In certain instances, at least one of the specified orientations can be selected to maintain the mobile electronic device in an upright or near upright orientation that facilitates viewing the screen of the mobile electronic device, for example for watching video and/or video conferencing on the device.

Figure 4:
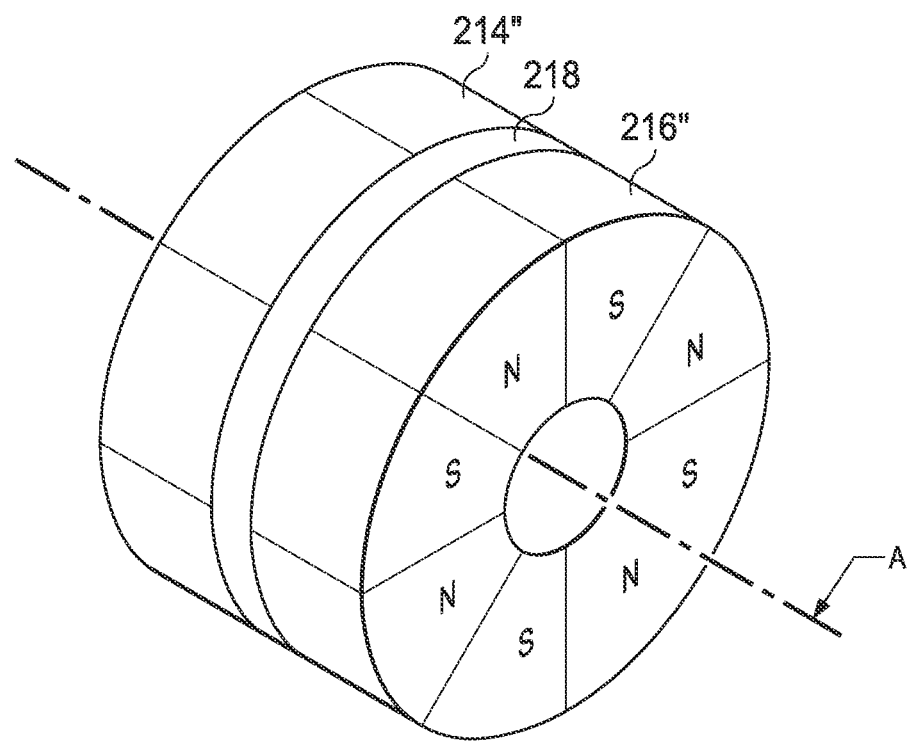
FIG. 4 is a perspective view of example alternate magnetic indexing parts.

FIG. 4 shows yet another configuration where the elements of the first magnetic indexing part 214" and the second magnetic indexing part 216" are arranged axially, instead of radially. To this end, the elements of the first magnetic indexing part 214" are a ring magnet coupled to the receptacle (e.g., receptacle 204) and the elements of the second magnetic indexing part 216" are a second ring magnet coupled to the base (e.g., base 202) adjacent the ring magnet of the first magnetic indexing part 214". Each of the ring magnets is configured to have multiple poles, each pair of poles corresponding to a specified orientation of the receptacle relative to the base. In certain instances, the indexing parts 214", 216" can be separated by a low friction ring 218 to reduce friction between the elements. When poles of the ring magnet of the receptacle are rotationally aligned with opposite poles of the ring magnet of the base, the opposite poles magnetically attract, creating an attractive force that supports the receptacle in a specified orientation relative to the base. When poles of the ring magnet of the receptacle are rotationally apart from opposite poles of the ring magnet of the base (i.e., like poles are aligned) the aligned poles do not magnetically attract and allow the receptacle to rotate relative to the base. Notably, in the configuration of FIG. 4 (and other configurations that use magnets both on the base and the receptacle), when like poles of the magnets are aligned, they repel and tend to push the receptacle toward the rotationally nearest specified orientation.

Therefore, the concepts here encompass a mobile electronic device support that includes magnetic indexing to support the device in one or more specified orientations. In certain examples, the indexing does not wear or substantially wear because the force for retaining the specified orientation is generated in whole or in part by magnetic fields. The frictional wear between moving parts, such as the indexing parts on the receptacle and the base, is dispersed, rather than concentrated as in mechanical indexing components, thus reducing wear and providing extended consistent operation over the life of the support. No lubrication is required. In certain examples, the magnetic indexing is simple and does not require complex, high precision, expensive and difficult to assemble mechanical indexing mechanisms.

A number of variations have been described. Nevertheless, it will be understood that various modifications may be made. Accordingly, other variations are within the scope of the following claims.

What is claimed is:

1. An electronic device support, the support comprising:
a receptacle comprising a first portion that is substantially cylindrical, a second portion that forms a cavity for inserting a portion of an electronic device, and a first magnetic indexing part included in the first portion; and
a base comprising a concave portion configured to receive the receptacle along a longitudinal axis of the first portion and a second magnetic indexing part, the first and second magnetic indexing parts configured to allow the receptacle when placed in the concave portion to rotate relative to the base when rotationally apart from a specified orientation and to magnetically support the receptacle when in the specified orientation.

2. The support of claim 1, where the specified orientation is a first specified orientation and where the first and second magnetic indexing parts are configured to allow the receptacle to rotate relative to the base when rotationally apart from the first specified orientation and when rotationally apart from a second, different specified orientation and to magnetically support the receptacle when in the first specified orientation and when in the second specified orientation.

3. The support of claim 2, where the base has a bottom surface configured to rest on a planar surface and where the first and second orientations are on a same side of a plane orthogonal to the planar surface.

4. The support of claim 2, where the base has a bottom surface configured to rest on a planar surface and where the first and second orientations are on opposite sides of a plane orthogonal to the planar surface.

5. The support of claim 2, where the first specified orientation is a typing orientation and the second specified orientation is a viewing orientation.

6. The support of claim 2, where the first and second magnetic indexing parts are configured to allow the receptacle to rotate relative to the base when rotationally apart from a third specified orientation that is different from the first and second orientations and to magnetically support the receptacle when in the third specified orientation.

7. The support of claim 1, where the first and second magnetic indexing parts are magnetically attracted to one another in magnetically supporting the receptacle in the specified orientation.

8. The support of claim 1, where the first and second magnetic indexing parts are not substantially magnetically attracted to one another in allowing the receptacle to rotate when apart from the specified orientation.

9. The support of claim 1, where the first magnetic index part comprises a magnet and the second magnetic index part comprises a magnet with a pole that is aligned with and magnetically attracted to an opposite pole of the magnet of the first magnetic index part when the receptacle is in the specified orientation.

10. The support of claim 1, where one of the first or second magnetic indexing parts comprises a ferrous metal piece and the other of the first and second magnetic indexing parts comprises a magnet that is magnetically attracted to the ferrous metal piece when the receptacle is in the specified orientation.

11. The support of claim 2, where one of the first or second magnetic indexing parts comprises a plurality of magnets angularly positioned around a male hinge component corresponding to the first and second orientations, and where the other of the first or second magnetic indexing parts comprises a plurality of magnets angularly positioned around a female hinge component corresponding to the first and second orientations.

12. The support of claim 1, where the first and second magnetic index parts provide all of the support maintaining the receptacle in the specified orientation.

13. The support of claim 1, where the electronic device comprises a touch screen and where the first and second magnetic indexing parts are configured to magnetically support the receptacle in the specified orientation while the touch screen is being actuated.

14. The support of claim 1, where the electronic device receiving cavity comprises a tablet computer receiving cavity.

15. A method, comprising:
supporting an electronic device in a hinged orientation relative to a base using magnetic interaction between a magnetic indexing component coupled to the base and a magnetic indexing component coupled to the electronic device and aligned with the magnetic component coupled to the base, wherein the electronic device is supported by a receptacle comprises a first portion that is substantially cylindrical and a second portion that forms a cavity that the electronic device is inserted, and the base comprises a concave portion configured to receive the receptacle along a longitudinal axis of the first portion; and
allowing the electronic device to hinge relative to the base when the magnetic indexing component coupled to the base is apart from the magnetic indexing component coupled to the electronic device.

16. The method of claim 15, further comprising supporting the electronic device in a second, different hinged orientation relative to the base using magnetic interaction between the magnetic indexing component coupled to the base and the magnetic indexing component coupled to the electronic device and aligned with the magnetic indexing component coupled to the base.

17. The method of claim 16, further comprising supporting the electronic device in a third hinged orientation relative to the base using magnetic interaction between a magnetic indexing component coupled to the base and a magnetic indexing component coupled to the electronic device and aligned with the magnetic indexing component coupled to the base.

18. The method of claim 15, where at least the magnetic indexing component coupled to the base or the magnetic indexing component coupled to the electronic device comprises a magnet and where the other of the magnetic indexing component coupled to the base and the magnetic indexing component coupled to the electronic device lacks a magnet.

19. A device comprising:
   an electronic device couple hinged to a base, wherein the electronic device is coupled by a receptacle comprises a first portion that is substantially cylindrical and a second portion that forms a cavity that the electronic device is inserted, and the base comprises a concave portion configured to receive the receptacle along a longitudinal axis of the first portion; and
   a magnetic detent part of the couple that interacts with a magnetic detent part of the base to support the couple relative to the base when the magnetic detent parts are aligned and that allow the couple to rotate relative to the base when the magnetic detent parts are misaligned.

20. The device of claim 19, where both the magnetic detent part of the couple and the magnetic detent part of the base are magnetic.

* * * * *